US009611822B2

(12) United States Patent
Walker

(10) Patent No.: US 9,611,822 B2
(45) Date of Patent: Apr. 4, 2017

(54) AIR FILTER AND SILENCER

(71) Applicant: Walker Engineering, Sun Valley, CA (US)

(72) Inventor: Robert Walker, Canyon Country, CA (US)

(73) Assignee: Walker Design, Inc., Sun Valley, CA (US)

( * ) Notice: Subject to any disclaimer, the term of this patent is extended or adjusted under 35 U.S.C. 154(b) by 64 days.

(21) Appl. No.: 13/730,555

(22) Filed: Dec. 28, 2012

(65) Prior Publication Data

US 2013/0167727 A1 Jul. 4, 2013

Related U.S. Application Data

(60) Provisional application No. 61/581,968, filed on Dec. 30, 2011.

(51) Int. Cl.

| | |
|---|---|
| ***B01D 50/00*** | (2006.01) |
| ***B01D 51/00*** | (2006.01) |
| ***B01D 39/00*** | (2006.01) |
| ***B01D 41/00*** | (2006.01) |
| ***B01D 45/00*** | (2006.01) |
| ***B01D 46/00*** | (2006.01) |
| ***B01D 49/00*** | (2006.01) |
| ***F02M 35/14*** | (2006.01) |

(52) U.S. Cl.
CPC .................................. *F02M 35/14* (2013.01)

(58) Field of Classification Search
CPC .... B01D 46/10; B01D 46/02; B01D 46/4236; B01D 46/2414; F24F 3/1603
See application file for complete search history.

(56) References Cited

U.S. PATENT DOCUMENTS

| | | | | |
|---|---|---|---|---|
| 2,385,814 | A * | 10/1945 | Kamrath | 96/383 |
| 2,815,825 | A * | 12/1957 | Dreznes | 96/383 |
| 2,904,129 | A * | 9/1959 | McMichael | 96/383 |
| 2,906,370 | A * | 9/1959 | McMullen et al. | 96/380 |
| 6,475,255 | B1 * | 11/2002 | Walker, Jr. | 55/315 |
| 6,726,738 | B1 * | 4/2004 | Walker, Jr. | 55/385.3 |
| 7,451,855 | B2 * | 11/2008 | Wang | 181/286 |
| 7,455,707 | B2 * | 11/2008 | Engel et al. | 55/428 |
| 8,016,903 | B2 * | 9/2011 | Nelson et al. | 55/357 |
| 8,663,355 | B2 * | 3/2014 | Nelson et al. | 55/521 |
| 2004/0074214 | A1 * | 4/2004 | Henson | 55/501 |

(Continued)

*Primary Examiner* — Amber R Orlando
(74) *Attorney, Agent, or Firm* — Snell & Wilmer L.L.P.

(57) ABSTRACT

Air filter and silencers comprise an air filter element having an annular body with openings at opposed ends. A top is attached over one of ends, has an outer flange sealed to the element, and includes a central section extending across the air filter element end. The top central section has a convex-shaped geometry with a radius of curvature projecting outwardly and away from the air filter element. The top central section includes a sound deadening material directed towards the air filter element. The top central section has a radius of curvature greater than the radius of an inside diameter of the air filter element. The air filter and silencer is used with an air filter assembly that includes a housing removably attached to the air filter and silencer, and that has an internal chamber projecting axially into the air filter and silencer with a sound deadening material disposed therein.

20 Claims, 2 Drawing Sheets

(56) References Cited

U.S. PATENT DOCUMENTS

| | | | | |
|---|---|---|---|---|
| 2008/0307759 | A1* | 12/2008 | Reichter et al. ................ | 55/428 |
| 2009/0100813 | A1* | 4/2009 | Iddings et al. .................. | 55/489 |
| 2010/0293906 | A1* | 11/2010 | Flagstad et al. ................ | 55/326 |
| 2012/0186207 | A1* | 7/2012 | Ushiyama et al. ............. | 55/493 |

* cited by examiner

AIR FILTER AND SILENCER

RELATION TO COPENDING PATENT APPLICATION

This patent application claims priority from U.S. Provisional Patent Application Ser. No. 61/581,968 filed on Dec. 30, 2011, which is hereby incorporated by reference in its entirety.

FIELD OF THE INVENTION

The present invention relates to a filter for filtering intake air for subsequent combustion by an engine or the like and, more specifically, to a filter that is specially engineered and constructed to additionally silence the air being filtered therethrough to thereby avoid the need to enclose the filter in a silencing housing or the like.

BACKGROUND OF THE INVENTION

The use of air filters for filtering intake air entering engines, such as gasoline and diesel powered internal combustion engines, for subsequent combination is well known. Such known air filters generally include an air filter element comprising a paper and/or foam filtering medium. The filter element is attached to a housing that is mounted to an intake system of an engine intake system in a manner enabling filtering of intake air passed through the housing to the engine.

Conventional air filter housings typically includes an air intake opening in air flow communication with fresh air, an air outlet opening in air flow communication with the engine intake system, and the air filter element is interposed between the two openings. The air filter element is typically annular in shape, and is mounted in the air filter housing by a releasible attachment that passes through the air filter housing and that is attached to the engine.

Many conventional air filter housings are constructed to enclose the air filter element for the purpose of reducing the noise, i.e., silencing, associated with the air being passed through the air filer during operation of the engine. Additionally, the housing may be configured to direct warm air to the air filter and subsequently into the intake system when the engine is in a cold state, and direct ambient temperature to the air filter and subsequently to the intake system when the engine is warmed up.

While the use of such conventional air filter housings are somewhat effective in silencing the noise associated with the air passing through air filters, a problem known to exist with such conventional air filter housing is that they tend to restrict or reduce the overall flow of air to the air filter, thereby operating to reduce the overall air intake efficiency of the engine. Additionally, the use of such conventional air filter housings may not be practical in engine fitment applications having only limited space.

It is, therefore, desired that an air filter be constructed in such a manner that avoids the need to use conventional air filter housing for the purpose of providing an effective level of noise reduction, suppression, or silencing. It is also desired that such air filter be constructed in a manner that provides an improved level of air flow therethrough when compared to air filters enclosed in conventional air filter housings. It is further desired that such air filter be constructed and configured in a manner that facilitates use with engine applications having tight spatial constraints.

SUMMARY OF THE INVENTION

Air filter and silencer constructions as disclosed herein generally comprise an air filter element comprising a body having an filtration material disposed therein in a manner permitting the passage of air through air filtration material for filtering the same. The air filter element comprises openings at opposed ends of the body. A top is disposed over and attached to one of the air filter element openings.

The top comprises an outer flange that is sealed and attached to the air filter element opening. The top includes a central section extending across the otherwise open end of the air filter element. The top central section has a convex-shaped geometry with a radius of curvature projecting outwardly and away from the air filter element. The top central section may include a sound deadening material disposed along an inside wall that is directed towards the air filter element. In example embodiment, the top central section has a radius of curvature that is greater than the radius of an inside diameter of the air filter element.

The air filter and silencer are designed to be attached with an air filter assembly, wherein the air filter assembly comprises a housing that is removably attached to the air filter and silencer. The housing comprises an internal chamber that projects axially into the air filter and silencer, and includes a sound deadening material disposed therein. In an example, the end of the housing internal chamber is positioned a distance of less than about 80 mm from the air filter and silencer top, and in a range of from about 30 mm to 50 mm from the air filter and silencer top.

In an example, the housing internal chamber extends from one end that is positioned within the air filter and silencer to an opposite end that is positioned outside of the air filter and silencer, wherein the sound deadening material extends between both ends. In an example, the housing internal chamber has a constant inside diameter that extends from a first end disposed within the air and silencer to a second end positioned outside of the air filter element and silencer. In another example, the housing internal chamber has first outside diameter that extends a distance from a first end disposed within the air and silencer, and second outside diameter extends a distance from the end positioned outside of the air filter element and silencer, wherein the first outside diameter is greater than the second outside diameter.

The air filer and silencer constructed in the manner disclosed herein avoids the need to use conventional air filter housing for the purpose of providing an effective level of noise reduction, suppression, or silencing. The air filter and silencer is constructed in a manner that provides an improved level of air flow therethrough when compared to air filters enclosed in conventional air filter housings. Further, air filter and silencers as disclosed herein are constructed and configured in a manner that facilitates use with engine applications having tight spatial constraints.

BRIEF DESCRIPTION OF THE DRAWINGS

The above and further objects, features and advantages of air filters as disclosed herein will be more fully understood and appreciated from the following description taken in conjunction with reference to the accompanying drawings in which.

DETAILED DESCRIPTION

Air filter and silencers of as disclosed herein comprise an air filter element including a top attached thereto and a base that are specially configured and constructed to provide a desired degree of sound deadening, sound absorbing, or silencing of the air passing into and through the filter element during operation. In a preferred embodiment, the air filter and silencer is provided in the form of a serviceable member releasibly attached to a base by a clamp assembly. In a preferred embodiment, the top is configured in the shape of an outwardly projecting dome, i.e., having a convex geometry when viewed from a position outside of the air filter and silencer. Additionally, air filter and silencers as disclosed herein can be used in air filter assemblies that include means for monitoring the air filter service life, e.g., restriction indicators, without having to visually inspect the air filter element itself.

Figure 1:
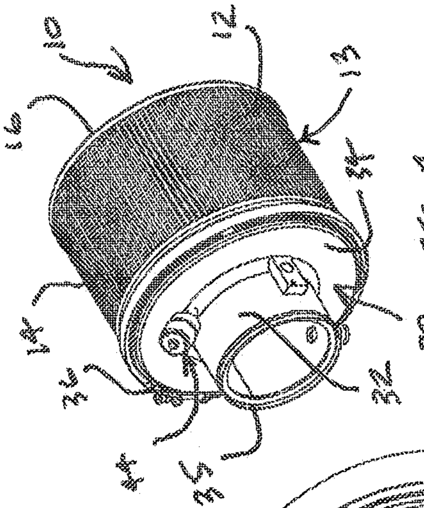
FIG. 1 is a perspective side elevational view of an air filter assembly comprising an air filter and silencer as disclosed herein.

FIG. 1 shows an air filter assembly 10 comprising an air filter and silencer 12 as disclosed herein. The air filter and silencer 12 comprises an air filter element 14. In an example embodiment, the air filter element is an annular element comprising a cylindrical body with open axial ends and a sidewall 13 extending between the axial open ends. The air filter element can be made from a paper material, a fiber or fabric material such as cotton, a polymeric material, foam materials and combinations thereof, which may or may not include a structural retaining element such as wire mesh or the like. The ends may be formed from an elastomeric material for purposes of forming an air-tight seal.

Figure 2:
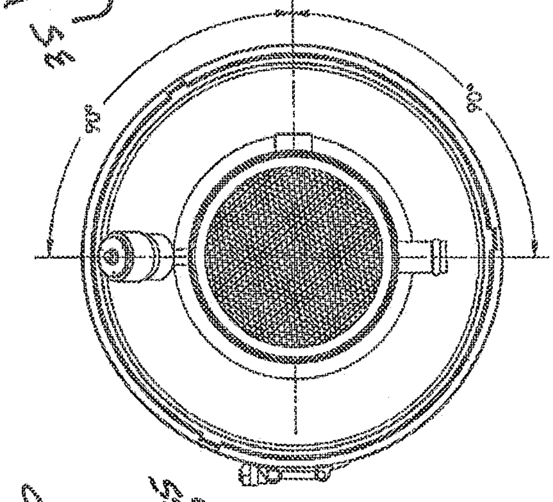
FIG. 2 is side view of the air filter assembly of FIG. 1.
Figure 2:
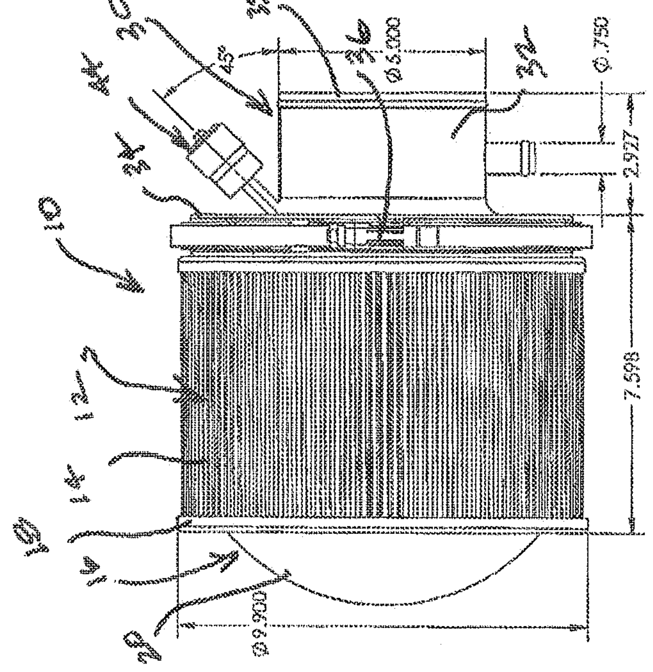
Figure 3:
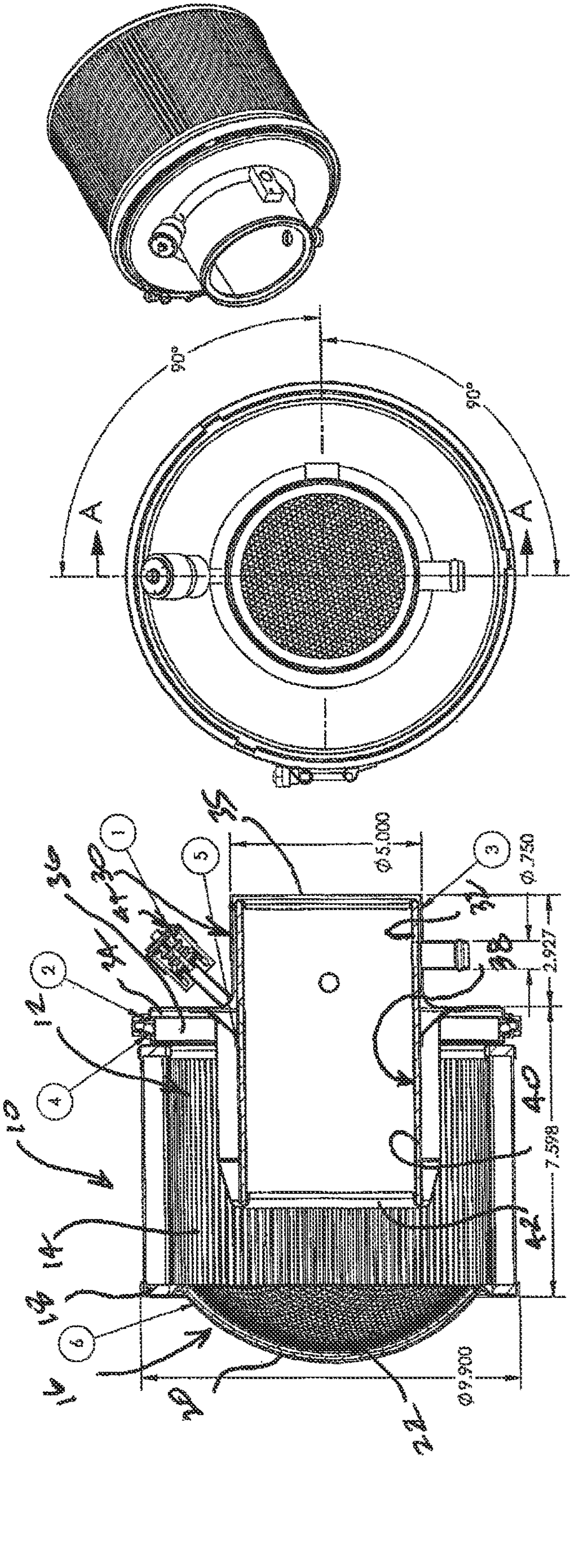
FIG. 3 is a side cross-sectional view of the air filter assembly of FIGS. 1 and 2.

The air filter and silencer 12 comprises a top 16 that is attached at one end of the air filter element 14. In a preferred embodiment, the top is fixedly attached to the air filter element so that it is not a removable member. The top has a circular shape that forms an air-tight seal with the cylindrical air filter end and is formed from a structurally rigid material such as metal and/or plastic As best illustrated in FIGS. 2 and 3, the top 16 comprises an outer flange 18 that is sized to fit over and attach with the end of the air filter element 14. Moving inwardly from the outer flange 18, the top includes a central section 20 that extends across the otherwise open end of the air filter element. The central section 20 is configured having an outwardly dome-shaped appearance, having a convex geometry. It has been discovered that the shape of this central section 20 influences the sound deadening or sound absorbing capacity of the top. In an example embodiment, it is desired that the central section 20 have a generally circular radius of curvature.

In a preferred embodiment, the radius of curvature of the top central section can be greater or less than the radius of the air filter element. For example, for an air filter and silencer comprising an air filter element having an outside diameter of approximately 254 mm, and an inside diameter of approximately 225 mm, the central section 20 is configured having a radius of curvature of approximately 125 mm. While a particular embodiment of the air filter and silencer has been disclosed for purposes of example and reference, it is to be understood that air filter and silencers sized other than this, e.g., for uses in applications calling for larger or smaller-sized units, are within the scope of the invention as disclosed herein.

As best illustrated in FIG. 3, the top central section 20 further comprises a sound deadening or sound absorbing material 22 that is disposed along an inside surface thereof. In a preferred embodiment, the sound absorbing or deadening material extends along the entire interior surface of the central section. The sound deadening material may be formed from suitable materials, e.g., paper, polymeric materials, fibers or fabrics, foams, combinations thereof, useful for reducing or attenuating the sound associated with operation of the air filter and silencer. In a preferred embodiment, the sound deadening material is provided in the form of a foam material that is provided having a layer thickness in the range of from about 6 to 12 mm.

Configured in the manner described above, the top 16 operates to silence and deaden the sound of the air passing through the air filter and silencer 12 during operation, and for this reason the top may also be referred to as a silencer.

The air filter assembly 10 comprises a housing 30 that is generally configured to attach the air filter and silencer 12 to an intake system of a combustion engine or the like. In an example embodiment, the housing comprises an air outlet section 32 that is designed to connect with an air intake system member of an internal combustion engine to direct air received and filtered through the air filter and silencer 12 to pass into the engine. In a preferred embodiment, the air outlet section 32 has a generally cylindrical construction having a diameter sized smaller than that of the air filter element.

The housing comprises a flange 34 that projects radially outwardly away from a surface of the air outlet section 32 and that is configured to provide an air-tight sealing surface with the open end of the air filter and silencer when mounted thereon. The flange is positioned a distance away from an open end 35 of the air outlet section 32. The flange is configured having an outside diameter that forms part of a connection point with a flanged portion of the open end of the air filter and silencer to facilitate providing a releasable connection therewith. In an example embodiment, the releasable connection is provided using a clasp or clamp 36 that is sized and configured for placement between the two adjacent flanges to provide a releasable attachment therewith. An air-tight seal is formed between the housing flange and the open end of the filter and silencer through the use of a suitable sealing member (not shown) that is interposed therebetween. In an example embodiment, the sealing member is provided in the form of an O-ring seal.

As best shown in FIG. 3, moving axially away from the connection flange 34, the housing 30 includes an internal silencing member 38 that extends axially distance away from the flange. The internal member 38 has a generally cylindrical construction, and is sized having an outside diameter that is less than an inside diameter of the air filter element to facilitate placement of the air filter element thereover. The internal member 38 is in air-flow communication with the air outlet section 32, and an annular chamber 40 is formed between inner and outer walls of the internal member. In an example embodiment, the internal member 38 has an inside diameter that is the same as the inside diameter of the air outlet section 32, and has an outside diameter that is larger than an outside diameter of the air outlet section. In such an example embodiment, the annular chamber 40 extends from the air outlet section to the internal member.

In an example embodiment, the annular chamber 40 is filled with a noise attenuating, absorbing, suppressing and/or deadening material for the purposes of further quieting the intake air noise, proximate the attached engine intake system member, associated with operating the engine. The noise attenuating material can be made from any material suitable for absorbing noise as air is passed thereover or therethrough. Suitable types of noise attenuating materials include those formed from paper, foam, fabric, polymer, or rubber materials. An inner wall of the annular chamber includes a number of openings or perforations disposed therethrough. The perforations operate to allow contact of filtered air passing through the housing with the sound deadening material within the annular chamber for the purposes of effecting a further desired noise silencing. The exact size and configuration of the internal member can and will differ depending on the particular air filter assembly application and desired noise deadening result. In an example embodiment, the sound deadening material extends through the annular chamber, i.e., from the air outlet section to the internal member, and the perforations extend along the inner wall defining the air outlet section to the internal member The housing 30 is shown having the air outlet section 32, the connection flange 34, and the internal member 40 provided as one-piece assembly. The housing 30 can be formed from conventional structurally suitable materials such as metal and the like, by conventional molding, machining, or fabricating methods. In an example embodiment, the housing is formed from metal.

As best illustrated in FIG. 3, the housing air outlet section 32 and the internal member 38 together define an air flow passageway that extends axially therethrough from the open end 35, at a terminal end of the air outlet section 32, to end 42, at a terminal end of the internal member 38. The air flow passageway directs filtered air processed through the air filter and silencer 12 to the engine intake system for subsequent combustion. As mentioned above, the air filter and silencer comprises the dome-shaped top including the sound deadening material, that when combined with the housing and the noise attenuating material disposed within the annular chamber, act together to absorb the noise of air traveling through the air flow passageway during operation of the engine.

When the air filter and silencer is mounted and attached to the housing, the air filter and silencer top central section is disposed a distance from the second housing end, i.e., the end of the internal member annular chamber. It has been discovered that an optimal degree of sound deadening is achieved by the synergistic effect of the air filter element and silencer top and the housing annular chamber when the top is positioned a determined distance from the housing second end. In an example embodiment, it is desired that the distance between the air filter element and silencer top and the housing second end be less than about 80 mm, and preferably in the range of from about 30 to 50 mm.

With respect to releasibly attaching the air filter element and silencer to the housing, when the clasp is positioned around the air filter and silencer and housing, it can be placed in either a locked or unlocked position to secure or release the joining of the air filter and silencer and housing. In an example embodiment, the clasp comprises a cantilever mechanism that operates to change the ring diameter clamp, expanding or contracting the diameter of the ring, to provide an open/unlocked or closed/locked position. The clasp may also include means for locking the clasp into a closed position. Such locking means can be in the form of a removable pin or the like placed through the clasp when it is in the closed position to make sure it does not open accidently. Alternatively, the locking means can be in the form of any type of mechanism or assembly that operates to prevent or resist the unwanted opening of the clasp once it has been closed into place.

When the clasp or clamp assembly is in the locked position, the air filter assembly 10 is fully assembled and ready for attachment to the engine for operation. The housing air outlet section 32 is secured to the air intake portion of the engine by conventional means, e.g., by threaded clamp-type attachment. While the engine is operating, a vacuum is created within the air flow passageway of the housing that draws air through the air filter and silencer element. The air filter element removes unwanted airborne particulate matter from the air as the top operates to silence the air being pulled through the air filter element. The filtered air is drawn upwardly within the air filter assembly over the end of the housing internal member 36, at which point the filtered air is directed through the air flow passageway and into the engine intake system.

Air filter assemblies, comprising the air filter and silencer as disclosed herein, may make use of a housing that is configured having a monitoring valve 44, which allows the degree of air filtration restriction within the assembly to be monitored. The degree of air filtration restriction reflects the condition of the air filter element and the amount of air that is able to pass through the filter element, thereby providing an indication of whether or not the air filter and silencer needs to be replaced. More specifically, the monitoring valve 44 measures the amount of vacuum within the air filter assembly, particularly between the air filter housing and the air filter member, during operation of the engine.

The monitoring valve 44 is attached to a measuring/indicating device configured to provide a signal indicating when a preset degree of vacuum is measured in the air filter assembly. As the air filter and silencer becomes plugged, the amount of vacuum registered by the monitoring valve increases, and when the preset degree of vacuum is reached, a signal is sent from the monitoring device indicating that the air filter element needs to be replaced. The signal can be provided in the form of a visual indication, or can be an audio or other type of signal, that functions to provide an indication of the status of the filter element and silences to the user without having to physically remove the air filter and silencer for visual inspection. Additionally, an example embodiment may include one or more open ports that can be used as a suction or vacuum source for use with a separate device, e.g., an emission device or system.

In addition to the specific features and embodiments described above, it is understood that the present invention includes all equivalents to the structures described herein, and is not to be limited to the disclosed embodiments. Individuals skilled in the art to which the present air filter and silencer and assembly pertains will understand that variations and modifications to the embodiments described can be used beneficially without departing from the scope of the invention.

What is claimed is:

1. An air filter and silencer comprising:

an air filter element comprising an annular cylindrical body having an air filtration material forming a cylindrical sidewall to permit the filtering of air passing radially therethrough, the air filter element comprising cylindrical openings at opposed axial ends of the annular cylindrical body; and a closed circular top disposed over and attached to one of the air filter element axial ends, the closed circular top comprising:

a circular outer flange positioned along a radial perimeter edge of the closed circular top and integral therewith is directly connected to and sealed with an axial end of the air filter element to form an air-tight seal with the air filter axial end; and a closed central section extending radially inwardly from the circular outer flange and integral therewith and across an otherwise open end of the air filter element at the air filter axial end sealed to the circular outer flange thereby completely covering the air filter element axial end, wherein the closed circular top extends radially inwardly in a planar fashion from the circular outer flange to the closed central section, wherein the closed central section has a continuous convex-shaped geometry moving inwardly away from the closed top radial perimeter edge and characterized by a radius of curvature projecting outwardly and away from the air filter element axial end, and wherein the top circular outer flange and closed central section are a continuous one-piece construction completely covering the air filter axial end.

2. The air filter and silencer as recited in claim 1 wherein the top closed central section further comprises a sound deadening material disposed along an inside wall that is directed towards the air filter element and that is in contact with air passing through the air filter element.

3. The air filter and silencer as recited in claim 1 wherein the radius of curvature is greater than the radius of an inside diameter of the air filter element.

4. An air filter assembly comprising the air filter and silencer as recited in claim 1, the air filter assembly further comprising a housing that is removably attached to the air filter and silencer, the housing comprising an internal chamber that projects axially into the air filter and silencer and that comprises a sound deadening material disposed therein.

5. The air filter assembly as recited in claim 4 wherein an end of the air filter assembly housing internal chamber is positioned a distance of less than about 80 mm from the air filter and silencer top.

6. The air filter assembly as recited in claim 5 wherein an end of the housing internal chamber is positioned a distance of from about 30 mm to 50 mm from the air filter and silencer top.

7. The air filter assembly as recited in claim 4 wherein the air filter assembly housing internal chamber extends from one end that is positioned within the air filter and silencer to an opposite end that is positioned outside of the air filter and silencer, wherein the sound deadening material extends between both ends.

8. The air filter assembly as recited in claim 4 wherein the air filter assembly housing internal chamber has a constant inside diameter that extends from a first end disposed within the air and silencer to a second end positioned outside of the air filter element and silencer.

9. The air filter assembly as recited in claim 4 wherein the air filter assembly housing internal chamber has a first outside diameter that extends a distance from a first end disposed within the air and silencer, and a second outside diameter extends a distance from the end positioned outside of the air filter element and silencer, wherein the first outside diameter is greater than the second outside diameter.

10. An air filter assembly comprising:

a housing comprising an air outlet section, a flange projecting radially away from the air outlet section, an internal member and an annular chamber, wherein the housing annular chamber comprises a sound deadening material disposed therein;

an air filter and silencer that is releasibly attached to the housing, the air filter and silencer comprising:

an air filter element having an annular cylindrical body with an air filtration material disposed along a cylindrical sidewall to permit the flow of air radially through the air filtration material, wherein the annular cylindrical body includes openings at opposed axial ends of the body, and a closed top disposed over and attached to an air filter element axial end, the closed top comprising:

a circular outer flange integral with the closed top that is in direct contact with and sealed to the air filter element axial end to form an air-tight seal with the air filter element axial end, wherein the circular outer flange extends radially inwardly from a parameter edge in a planar manner; and a closed central section extending radially inwardly from the circular outer flange and integral therewith and extending across and completely covering the air filter element axial end, the closed central section having a continuous convex-shaped geometry with a radius of curvature projecting outwardly and away from the air filter element, wherein the closed top comprising the circular outer flange and closed central section is a one-piece construction.

11. The air filter assembly as recited in claim 10 wherein the closed top comprises a sound deadening or sound absorbing material disposed along an inside surface, wherein the sound deadening or sound absorbing material in the closed top is in contact with air passing through the assembly.

12. The air filter assembly as recited in claim 10 wherein the sound deadening material in the annular chamber extends from the air outlet section to the internal member.

13. The air filter assembly as recited in claim 10 wherein the internal member includes an end that is positioned a distance of less than about 80 mm from the air filter and silencer top.

14. The air filter assembly as recited in claim 10 wherein the internal member includes an end that is positioned a distance of from about 30 mm to 50 mm from the air filter and silencer top.

15. An air filter and silencer comprising:

an annular cylindrical air filter element having open axially opposed ends with an air filtration material disposed along a sidewall portion extending between the axially opposed ends to facilitate radially inward directed air flow through the air filtration material; and a closed circular top disposed over and nonremovably attached to one of the air filter element axially opposed ends, the closed top comprising:

a circular outer flange that is integral with the closed top and that is in direct contact with and sealed to the one air filter element axial end; and a closed central section extending radially inwardly from and integral with the circular outer flange and extending across to completely cover the one air filter element axial end, the closed top comprising a planar section extending radially between the cylindrical outer flange and the closed central section, the closed central section having a continuous convex-shaped geometry with a radius of curvature projecting outwardly and away from the air filter element, the closed central section comprising a sound absorbing material disposed thereon that is in contact with air passing through the air filter element, and the radius of curvature being greater than the radius of an inside diameter of the air filter element, wherein the closed top comprising the circular outer flange and closed central section is a one-piece construction.

16. An air filter assembly comprising the air filter and silencer as recited in claim 15, the air filter assembly comprising a housing that is removably attached to the air filter and silencer, the air filter housing comprising an internal chamber that projects axially into the air filter and silencer and that comprises a sound deadening material disposed therein.

17. The air filter assembly as recited in claim 16 wherein an end of the air filter assembly housing internal chamber is positioned a distance of less than about 80 mm from the air filter and silencer closed top.

18. The air filter assembly as recited in claim 17 wherein an end of the air filter assembly housing internal chamber is positioned a distance of from about 30 mm to 50 mm from the air filter and silencer closed top.

19. The air filter assembly as recited in claim 16 wherein the air filter assembly housing internal chamber extends axially from one end that is positioned within the air filter and silencer to an opposite end that is positioned outside of the air filter and silencer, wherein the sound deadening material extends between both ends.

20. The air filter assembly as recited in claim 16 wherein the air filter assembly housing internal chamber has a constant inside diameter that extends from a first end disposed within the air and silencer to a second end positioned outside of the air filter element and silencer.

* * * * *